United States Patent
Shumaker et al.

(10) Patent No.: US 8,566,071 B2
(45) Date of Patent: Oct. 22, 2013

(54) CALIBRATION AND SYNCHRONIZATION OF MICRO AIR VEHICLE AUTOPILOTS

(75) Inventors: Justin Lee Shumaker, Edgewood, MD (US); Kamal Sharaf Ali, Jackson, MS (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 402 days.

(21) Appl. No.: 12/906,778

(22) Filed: Oct. 18, 2010

(65) Prior Publication Data

US 2011/0264427 A1  Oct. 27, 2011

Related U.S. Application Data

(60) Provisional application No. 61/254,954, filed on Oct. 26, 2009.

(51) Int. Cl.
- *G06G 7/70* (2006.01)
- *G06G 7/72* (2006.01)
- *G09B 9/12* (2006.01)
- *G05D 1/00* (2006.01)

(52) U.S. Cl.
USPC .................................. 703/8; 434/31; 701/11

(58) Field of Classification Search
USPC ..................................................... 434/31, 45
See application file for complete search history.

(56) References Cited

U.S. PATENT DOCUMENTS

| | | |
|---|---|---|
| 5,260,874 A | 11/1993 | Berner et al. |
| 6,778,924 B2 | 8/2004 | Hanse et al. |
| 6,968,281 B2 | 11/2005 | Hanse |

OTHER PUBLICATIONS

Shumaker et al. "A Gimbaled Platform for MAV Autopilot Simulation and Calibration", Oct. 26, 2008, 27th Digital Avionics Systems Conference, IEEE, 10 pages.*
Ali, K., Carter, L.: Miniature-autopilot evaluation system. J. Computer Sci. 4, 30-35 (2008).

* cited by examiner

*Primary Examiner* — Suzanne Lo
(74) *Attorney, Agent, or Firm* — Alan I. Kalb; Eric B. Compton

(57) ABSTRACT

A system, method, and apparatus to train autopilots to fly a simulated aeronautical vehicle includes a three-degree of freedom gimbaled platform comprising a pitch, roll, and yaw axis; an autopilot comprising an inertial measurement unit mounted to the platform; motors that rotate the platform along the pitch, roll, and yaw axes; shaft encoders connected to the motors to calculate an angular position of the platform; motor drivers connected to the motors to power the motors; a microcontroller connected to the motor drivers; a quadrature encoder connected to the shaft encoders and the microcontroller; sensors that generate and sense environmental conditions affecting the platform and the autopilot; a flight simulator connected to the microcontroller; and a computer that executes the flight simulator causing actuation of the platform, causing the sensors to generate environmental conditions, and causing the autopilot to react to the environmental conditions.

20 Claims, 13 Drawing Sheets

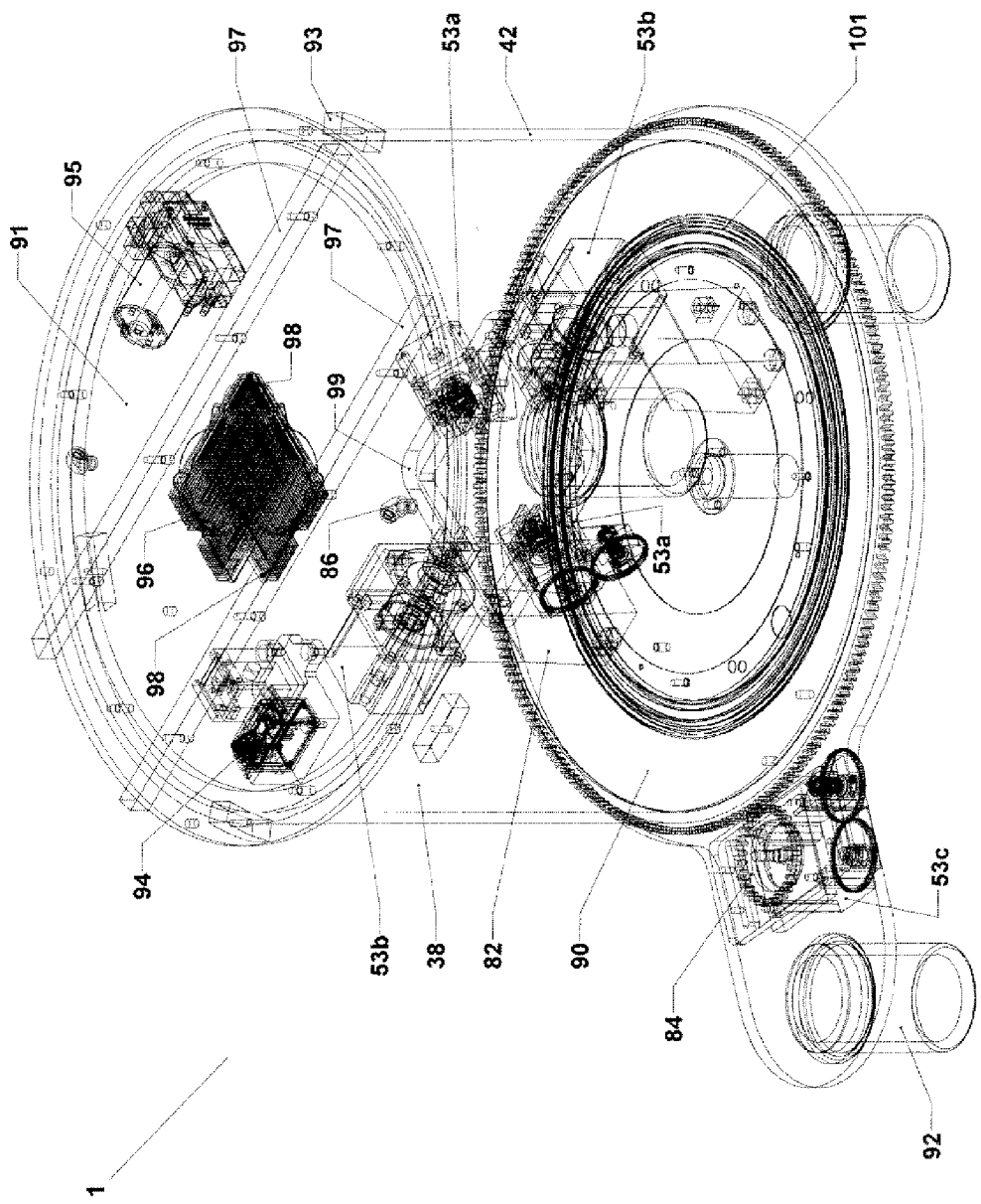

CALIBRATION AND SYNCHRONIZATION OF MICRO AIR VEHICLE AUTOPILOTS

CROSS REFERENCE TO RELATED APPLICATION

This application claims the benefit of U.S. Provisional Patent Application No. 61/254,954 filed on Oct. 26, 2009, the complete disclosure of which, in its entirety, is herein incorporated by reference.

GOVERNMENT INTEREST

The embodiments herein may be manufactured, used, and/or licensed by or for the United States Government without the payment of royalties thereon.

BACKGROUND

1. Technical Field

The embodiments herein generally relate to flight simulation and training and, more particularly, to the calibration and synchronization of autopilots used in controlled flight simulation and training exercises.

2. Description of the Related Art

Conventional calibration of an inertial measurement unit (IMU) through open loop data collection includes typical flight simulator systems that provide processed stimuli to emulate real-life flight conditions. Other solutions involve testing inertial measurement devices on a multi-axis rate table using a processor internal to the inertial measurement devices and transferring the signals directly to the processors for determining and storing the calibration coefficients of the inertial measurement devices internally so that they are self-calibrating. Unfortunately, conventional solutions typically involve evaluating control algorithms in a computer simulation before experimentation in the aircraft occurs. This can result in unstable flight during the first few cycles, which could lead to failure of the aircraft.

SUMMARY

In view of the foregoing, an embodiment herein provides an apparatus for training an autopilot to fly a simulated aeronautical vehicle, wherein the apparatus comprises a three-degree of freedom gimbaled platform comprising a pitch axis, a roll axis, and a yaw axis; an autopilot component operatively connected to the platform, wherein the autopilot component comprises an inertial measurement unit; a plurality of motors that rotate the platform along the pitch, roll, and yaw axes; a plurality of shaft encoders operatively connected to the plurality of motors, wherein the plurality of shaft encoders calculate an angular position of the platform; a plurality of motor drivers operatively connected to the plurality of motors, wherein the plurality of motor drivers power the plurality of motors; a microcontroller operatively connected to the plurality of motor drivers; a quadrature encoder operatively connected to the plurality of shaft encoders and the microcontroller; a plurality of sensors that generate and sense environmental conditions affecting the platform and the autopilot; a flight simulator module operatively connected to the microcontroller; and a computer that executes the flight simulator module, wherein execution of the flight simulator module causes actuation of the platform, causes the plurality of sensors to generate environmental conditions, and causes the autopilot component to react to the environmental conditions.

The plurality of motors may comprise a first pair of stepper motors that control movement of the platform along the pitch axis; a second pair of stepper motors that control movement of the platform along the roll axis; and a stepper motor that controls movement of the platform along the yaw axis. The apparatus may further comprise a planetary gearbox operatively connected to the motor that controls movement of the platform along the yaw axis. The apparatus may further comprise a temperature and pressure regulating enclosure that encases the platform. The apparatus may further comprise means for forcing air into the enclosure; and means for drawing air out of the enclosure. Preferably, the microcontroller controls the plurality of motors, processes angular data from the plurality of shaft encoders, and receives angular update commands from the computer. Preferably, the microcontroller sends operational instructions to the quadrature encoder, and wherein the quadrature encoder sends the operational instructions to the plurality of shaft encoders. The environmental conditions may comprise global positioning system bearings, wind speed, barometric pressure, temperature, humidity, and electromagnetically generated headings.

In one embodiment, the platform operates in an open loop mode such that the computer generates signals to actuate the platform to subject the autopilot component to designated attitudes. In another embodiment, the platform operates in a closed loop mode such that the autopilot component drives the flight simulator module as the flight simulator module drives the platform, and wherein between each time step of the flight simulator module, the autopilot component reads the inertial measurement unit to obtain updated attitude data.

Another embodiment provides a system for training an autopilot to fly a simulated aeronautical vehicle, wherein the system comprises a three-degree of freedom gimbaled platform comprising a pitch axis, a roll axis, and a yaw axis; a micro air vehicle autopilot operatively connected to the platform, wherein the micro air vehicle autopilot comprises an inertial measurement unit; a temperature and pressure regulating enclosure that encases the platform and the micro air vehicle autopilot; a first pair of motors that control movement of the platform along the pitch axis; a second pair of motors that control movement of the platform along the roll axis; a motor that controls movement of the platform along the yaw axis; a gearbox operatively connected to the motor that controls movement of the platform along the yaw axis; a plurality of shaft encoders operatively connected to the plurality of motors, wherein the plurality of shaft encoders calculate an angular position of the platform; a plurality of motor drivers operatively connected to the plurality of motors, wherein the plurality of motor drivers power the plurality of motors; a microcontroller operatively connected to the plurality of motor drivers; a quadrature encoder operatively connected to the plurality of shaft encoders and the microcontroller; a plurality of sensors that generate and sense environmental conditions affecting the platform and the micro air vehicle autopilot, wherein the environmental conditions comprise global positioning system bearings, wind speed, barometric pressure, temperature, humidity, and electromagnetically generated headings; a flight simulator operatively connected to the microcontroller; and a computer that executes the flight simulator, wherein execution of the flight simulator module causes actuation of the platform, causes the plurality of sensors to generate environmental conditions, and causes the micro air vehicle autopilot to react to the environmental conditions.

The gearbox may comprise a planetary gearbox comprising a gear ratio of 10:1. The system may further comprise means for forcing air into the enclosure; means for drawing air out of the enclosure; and a video camera operatively connected to the platform. The microcontroller preferably controls the first pair of motors, the second pair of motors, and the motor, processes angular data from the plurality of shaft encoders, and receives angular update commands from the computer. Preferably, the microcontroller sends operational instructions to the quadrature encoder, and wherein the quadrature encoder sends the operational instructions to the plurality of shaft encoders. In one embodiment, the platform operates in an open loop mode such that the computer generates signals to actuate the platform to subject the micro air vehicle autopilot to designated attitudes. In another embodiment, the platform operates in a closed loop mode such that the micro air vehicle autopilot drives the flight simulator as the flight simulator drives the platform, and wherein between each time step of the flight simulator, the micro air vehicle autopilot reads the inertial measurement unit to obtain updated attitude data.

Another embodiment provides an electro-mechanical method of training a micro air vehicle autopilot to fly a simulated aeronautical vehicle in a controlled experimental environment, wherein the method comprises mounting the micro air vehicle autopilot comprising an inertial measurement unit to a three-degree of freedom gimbaled platform comprising a pitch axis, a roll axis, and a yaw axis; rotating the platform along the pitch, roll, and yaw axes; calculating an angular position of the platform; controlling motion of the platform based on the angular position of the platform; simulating flight-like conditions by stimulating the platform with controlled environmental conditions to affect a functioning of the platform; using sensors to sense the environmental conditions; synchronizing the inertial measurement unit of the micro air vehicle autopilot with the data sensed by the sensors; allowing the micro air vehicle autopilot to operationally react to the sensors and the environmental conditions; and evaluating a performance of the micro air vehicle autopilot based on the operational reactions of the micro air vehicle autopilot. The environmental conditions may comprise global positioning system bearings, wind speed, barometric pressure, temperature, humidity, and electromagnetically generated headings. The method may further comprise calibrating the micro air vehicle autopilot using the operational reactions of the micro air vehicle autopilot as a feedback control mechanism of the simulated flight-like conditions.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 1B illustrates a schematic diagram of an apparatus according to the embodiments herein;

DETAILED DESCRIPTION OF PREFERRED EMBODIMENTS

Figure 1A:
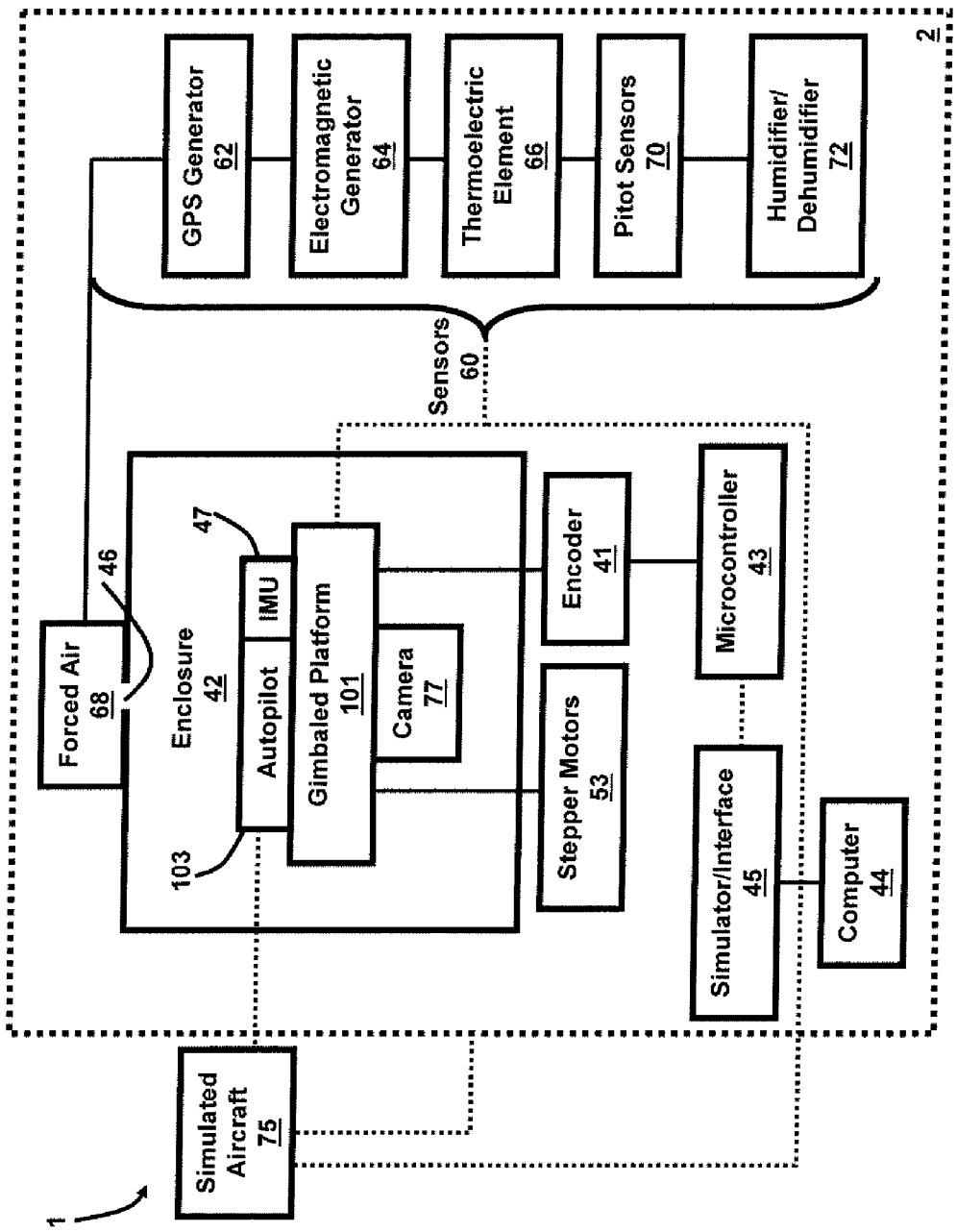
FIG. 1A illustrates a block diagram of an apparatus according to the embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide an apparatus, system, and method for subjecting an autopilot to real flight conditions in a controlled (e.g., laboratory) setting such that after using a gimbaled platform system provided by the embodiments herein, the autopilot is trained to perform identically or nearly identically in real flight, as it did in the simulated environment. Referring now to the drawings, and more particularly to FIGS. 1A through 10, where similar reference characters denote corresponding features consistently throughout the figures, there are shown preferred embodiments.

An apparatus 1 provided herein comprises a plurality of hardware components as shown in FIG. 1A. The apparatus 1 includes a three-degree of freedom platform 101 actuated by stepper motors 53a-53c (collectively referred to as stepper motors 53) with optical shaft encoders 51a-51c. A microcontroller 43 communicates with an interface module 45 running on a computer 44. A temperature and pressure regulating enclosure 42 surrounding the gimbaled platform 101 with a forced air mechanism 68 (e.g., solenoid, fan, etc.) attached to a small opening 46 in the enclosure 42 may also be included. The apparatus 1 further includes a plurality of sensors 60 including a global positioning system (GPS) signal generator 62, an electromagnetic generator 64, a thermoelectric element 66 to control temperature, the ported forced air mechanism 68 to simulate wind speed for pitot sensors 70, a humidifier and dehumidifier 72 to control humidity, and an autopilot 103 with IMU hardware 47 mounted to the gimbaled platform 101.

A schematic diagram of one example implementation of the apparatus 1 is illustrated in FIG. 1B (with reference to FIG. 1A). In FIG. 1B, the apparatus 1 is shown to include a plurality of base support structures 92 used for structural support of the apparatus 1. An enclosure 42 encases most of the components of the apparatus 1 including a pair of stepper motors 53a for pitch and a pair of stepper motors 53b for roll, which are used to rotate a pitch structure 99 that holds the autopilot 103 (not shown in FIG. 1B). A pair of support legs 82 provides support for the stepper motors 53b, which then provide support for the attached pitch structure 99 and attached stepper motors 53a. The support legs 82 connect with a base 90 of the platform 101, which is supported by the base support structures 92. The stepper motor 53c for yaw is attached to a gearbox 84, which are both located outside the enclosure 42 according to one embodiment; although these may be located within the enclosure 42 in another embodiment. Although not easily visible in the view of FIG. 1B, the apparatus 1 further includes shaft encoders 51a-51c and motor drivers 55a-55c that are operatively connected to each of the stepper motors 53a-53c, respectively.

The enclosure 42 comprises a plurality of handle supports 93 configured along the outer wall 38 of the enclosure 42. The enclosure 42 further includes a top component 91, which comprises a pair of elongated support structures 97 to provide additional structural support to the enclosure 42. A pair of heat sinks 98 and a thermoelectric Peltier element (not shown) are operatively connected to a control mechanism 96, which is used to regulate temperature, air pressure, and barometric pressure within the enclosure 42. In the example embodiment shown in FIG. 1B, the control mechanism 96 works with a solenoid 94 to force air into the enclosure 42 thereby regulating (increases/decreases) the internal pressure within the enclosure 42. A vacuum pump 95 also works with the control mechanism 96 to draw air out of the enclosure 42. Air access tubes 86, 88 are used in conjunction with the solenoid 94 and vacuum pump 95, respectively, to facilitate the movement of air in/out of the enclosure 42. In this regard, the tubes 86, 88 are analogous to the small opening 46 of FIG. 1A.

The embodiments herein permit an autopilot 103 to fly a simulated aircraft 75. The simulated aircraft 75 uses stimuli produced by the gimbaled platform system 2 as inputs for the sensors 60 to actuate the platform 101 and make the autopilot 103 respond as though it were in real flight. This permits calibration and evaluation of the autopilot 103 in a controlled environment. Furthermore, the embodiments herein allow for the calibration of the autopilot 103 using the sensors 60 to generate new control surface data based on a control algorithm(s). Additionally, the embodiments herein allow for the synchronization of the IMU 47 of the autopilot 103 with the other on-board sensors 60. Moreover, the embodiments herein provide a universal method in which all micro air vehicle (MAV) autopilots 103 can be evaluated for their performance in a systematic way without having the autopilots 103 fly in an actual aircraft.

Figure 2:
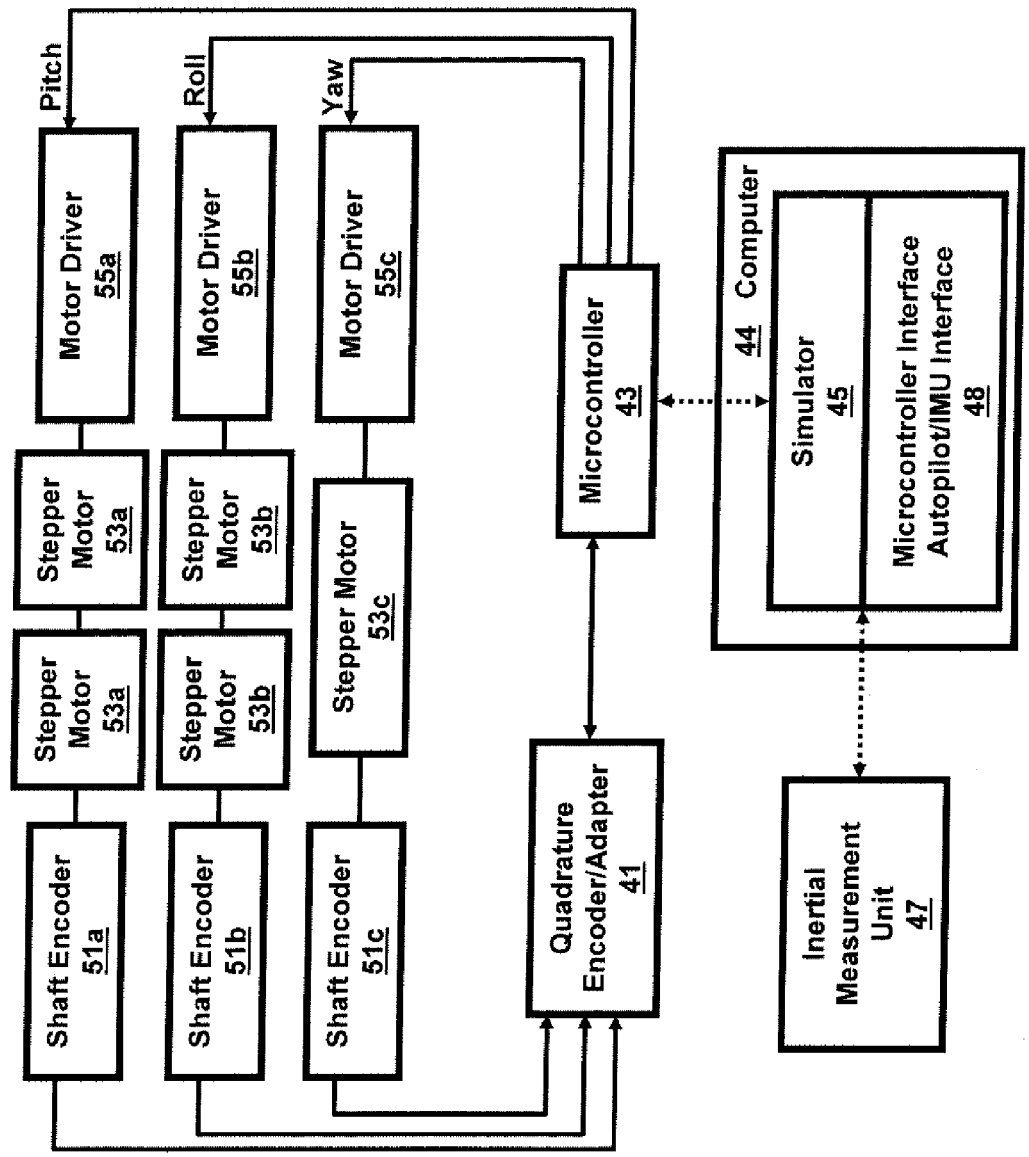
FIG. 2 illustrates a block diagram of a system according to the embodiments herein.

As shown in FIGS. 1A through 2, the gimbaled platform 101 can be used to calibrate small autopilots 103 or IMUs 47. The platform 101 can further function as a flight simulator on which an autopilot 103 can be evaluated and developed. The platform 101 is controlled by a plurality of stepper motors 53; including two stepper motors 53a for pitch, two stepper motors 53b for roll, and one stepper motor 53c for yaw. The stepper motors 53 preferably have a resolution of 0.18 degrees per step using existing micro-stepping technology. To compliment the stepper motors 53, optical shaft encoders 51a-51c are affixed to all three axes of the platform 101. The shaft encoders 51a-51c supply accurate readings of the attitude of the platform 101. By placing the autopilot 103 on the platform 101, while actuating the platform 101 to simulate flight, IMU data and the corresponding data of the shaft encoders 51a-51c may be collected. This data can be used to fine tune the contribution from each of the IMU sensors 60 to minimize overall error. Furthermore, the data can also be utilized in the training of neural networks or any other type of filter (e.g., Kalman, etc.) to further minimize IMU error.

The platform 101 can also be configured as a synchronization tool. For example, synchronizing IMU and video images for target geolocation. This is accomplished by placing both a video camera 77 and autopilot 103 on the platform 101 where they are synchronized with the optical shaft encoders 51a-51c. The exact IMU data corresponding to each video frame can then be obtained, thus rendering the target geolocation system more accurate.

The platform 101 can be integrated with any commercially-available Federal Aviation Administration (FAA) approved flight simulator such as, for example, the X-Plane® software available from Laminar Research, S.C., USA. New flight surface positions can be generated by the autopilot 103 or interface module 48, which are then passed back to the simulator 45 where the resulting change in airframe attitude is rendered. This new attitude data is also passed to the motor control system (e.g., microcontroller 43) of the platform 101, which updates the attitude of the platform 101. In this configuration, GPS as well as barometric and wind speed data generated by the simulator 45 are supplied to the autopilot 103. Using the platform 101 as a flight simulator 45 allows for the evaluation of an autopilot control algorithm(s) using different airframes as well as performance testing under different weather conditions in an easy and controlled manner.

Figure 3A:
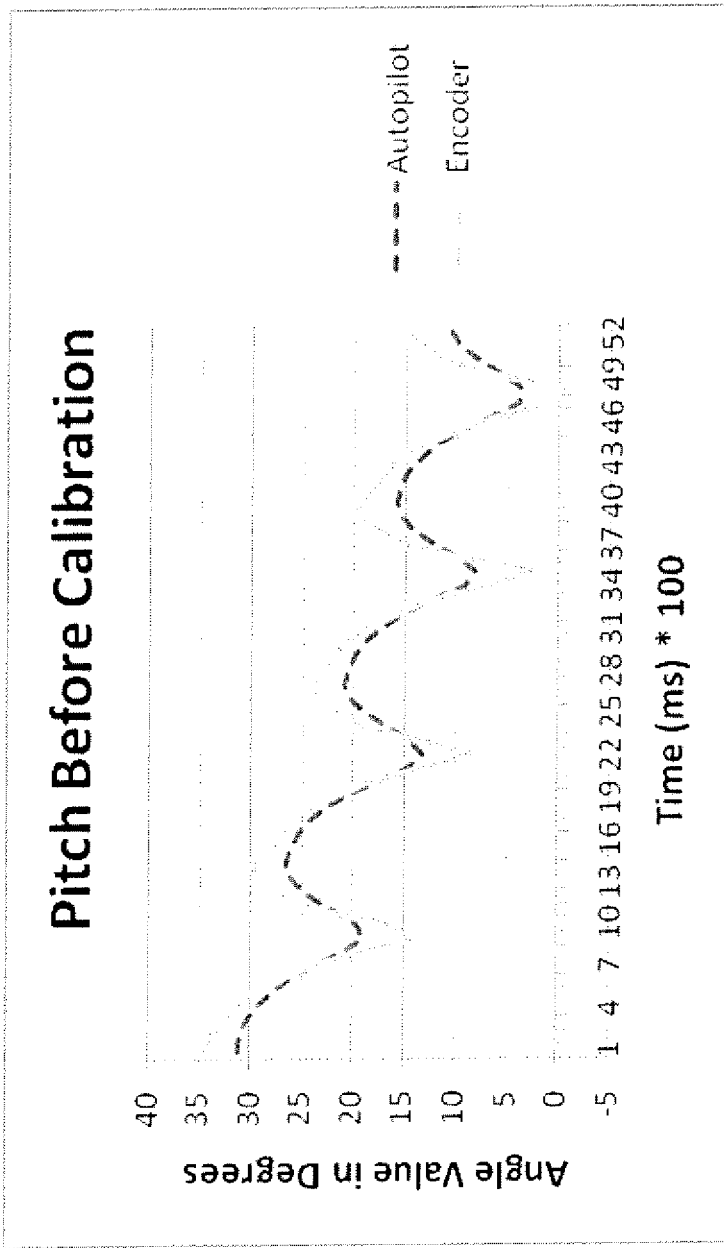
FIG. 3A is a graphical representation illustrating results achieved prior to calibration using the embodiments herein.
Figure 3B:
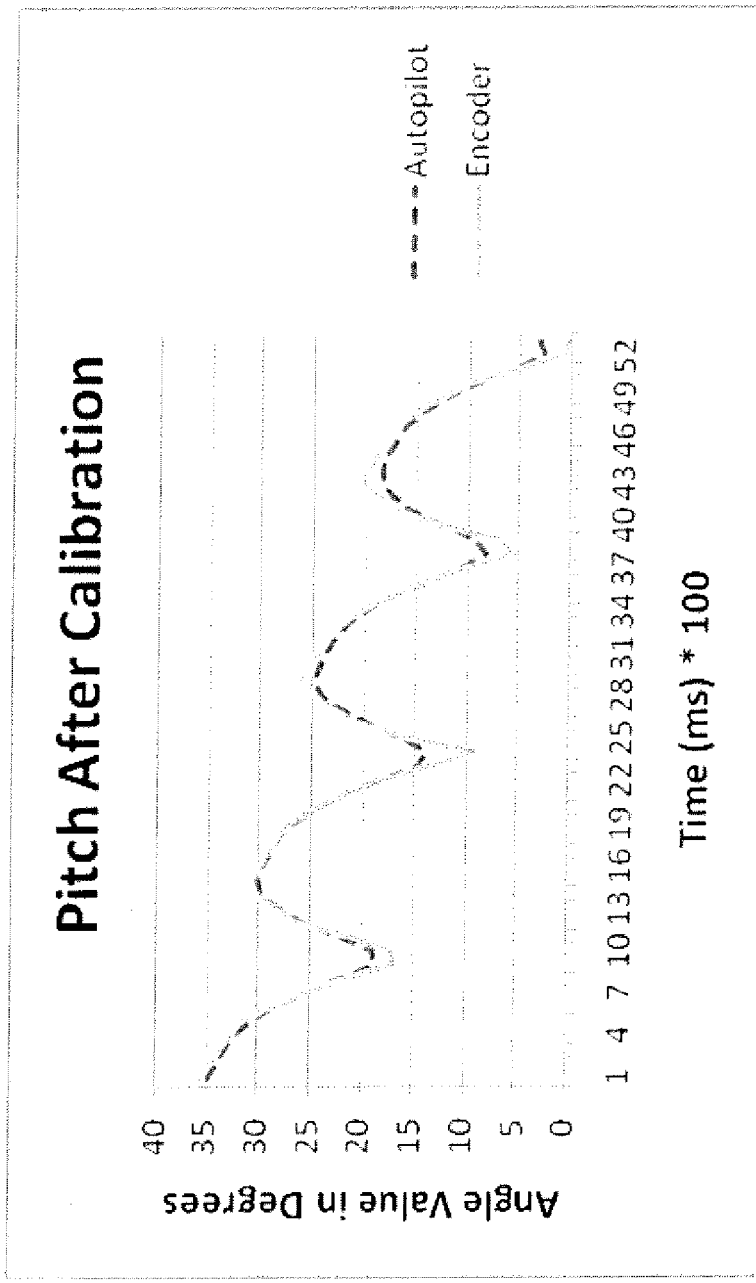
FIG. 3B is a graphical representation illustrating results achieved after calibration using the embodiments herein.
Figure 4A:
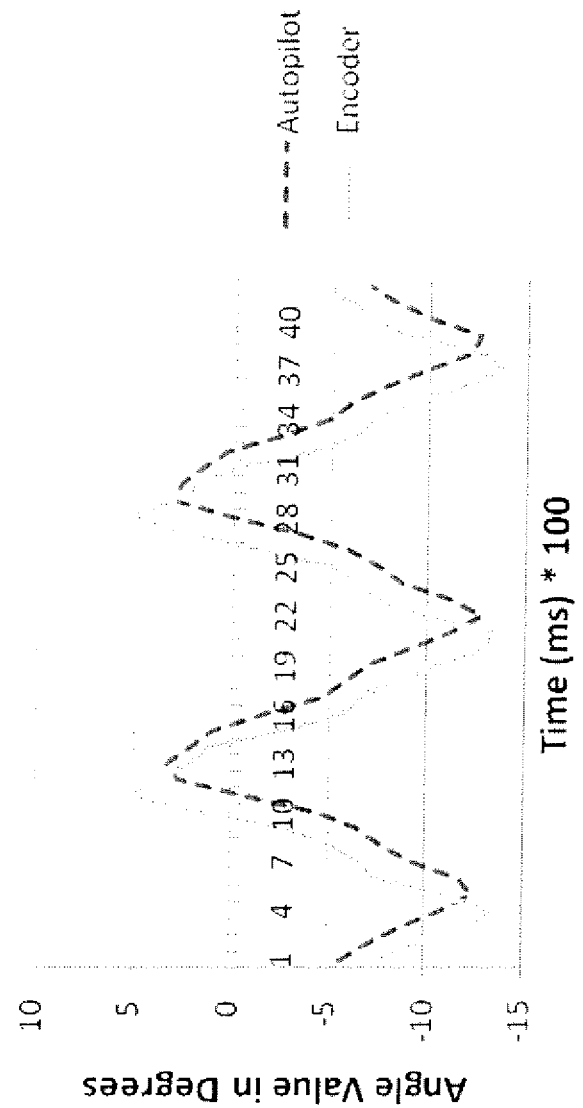
FIG. 4A is a graphical representation illustrating results of raw data of autopilot and encoder measurements.
Figure 4B:
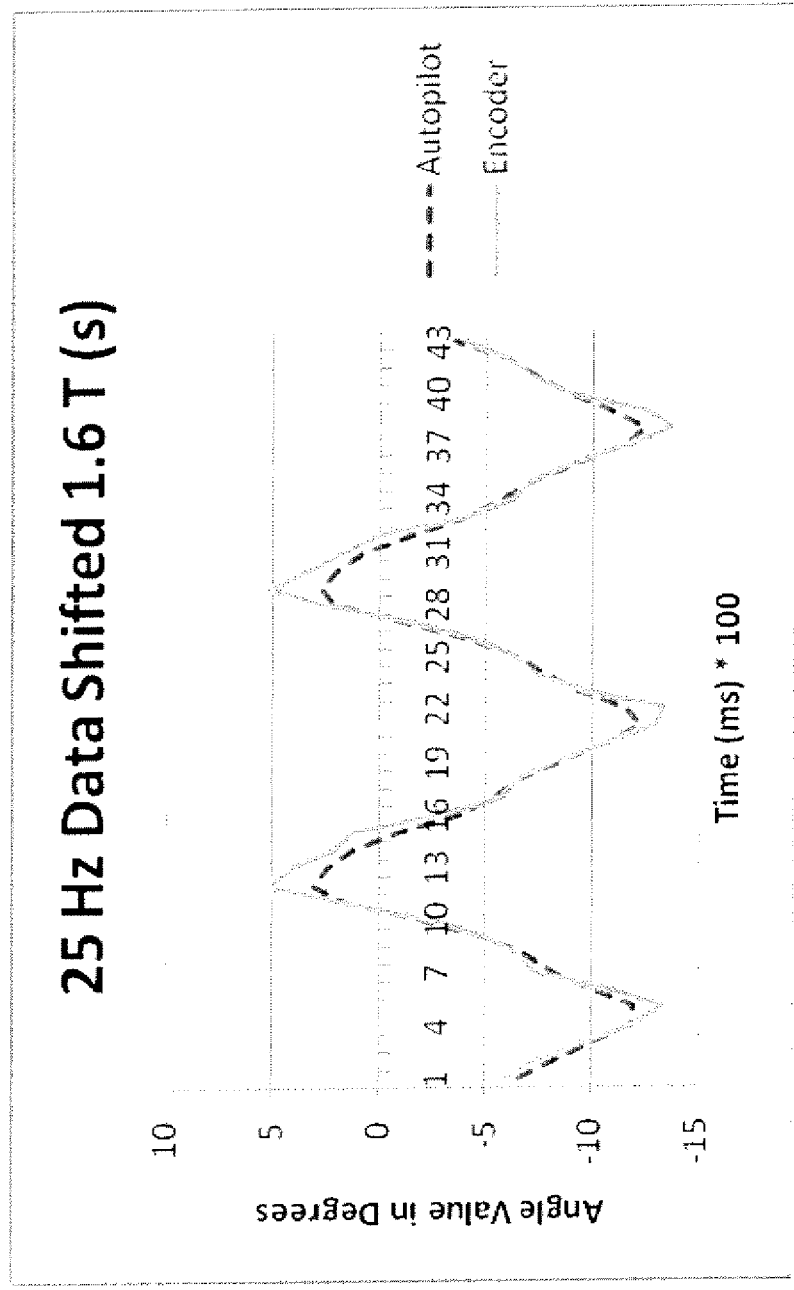
FIG. 4B is a graphical representation illustrating results achieved by synchronizing the data of the autopilot with the data of the shaft encoders according to the embodiments herein.

Before creating the three-degree of freedom gimbaled platform 101, a two-degree of freedom platform (not shown) may be utilized as a proof-of-concept tool. The two-degree of freedom platform (not shown) may be used to calibrate the pitch and roll for an IMU on an open source autopilot. After carefully analyzing the recorded data and making adjustments to the IMU algorithm, a thirty percent improvement in accuracy can be realized as depicted in FIGS. 3A and 3B.

Experimentally, the platform 101 provides pitch and roll measurements. While time synchronization errors between the platform 101 and autopilot 103 may occur, such errors may be corrected using computer-readable software. With the platform 101 and autopilot 103 operating in a 25 Hz open loop configuration, the data may be shifted by 1.6 T (64 ms) to synchronize the data of the autopilot 103 with the data of the shaft encoders 51a-51c. This result can be seen in FIGS. 4A and 4B.

Experimentally, the platform 101 hosts an autopilot with dimensions up to 5"×7". The stepper motors 53a-53c are used to control the rotation of the platform 101 while the optical shaft encoders 51a-51c are used to report the exact angular position of the platform 101. The pair of stepper motors 53a are used to rotate the platform 101 about the pitch axis while two larger stepper motors 53b rotate the platform 101 about the roll axis. Another stepper motor 53c with a planetary gearbox 84, having a gear ratio of 10:1, is mounted to the base 90 of the platform 101 to control the yaw axis.

Figure 5:
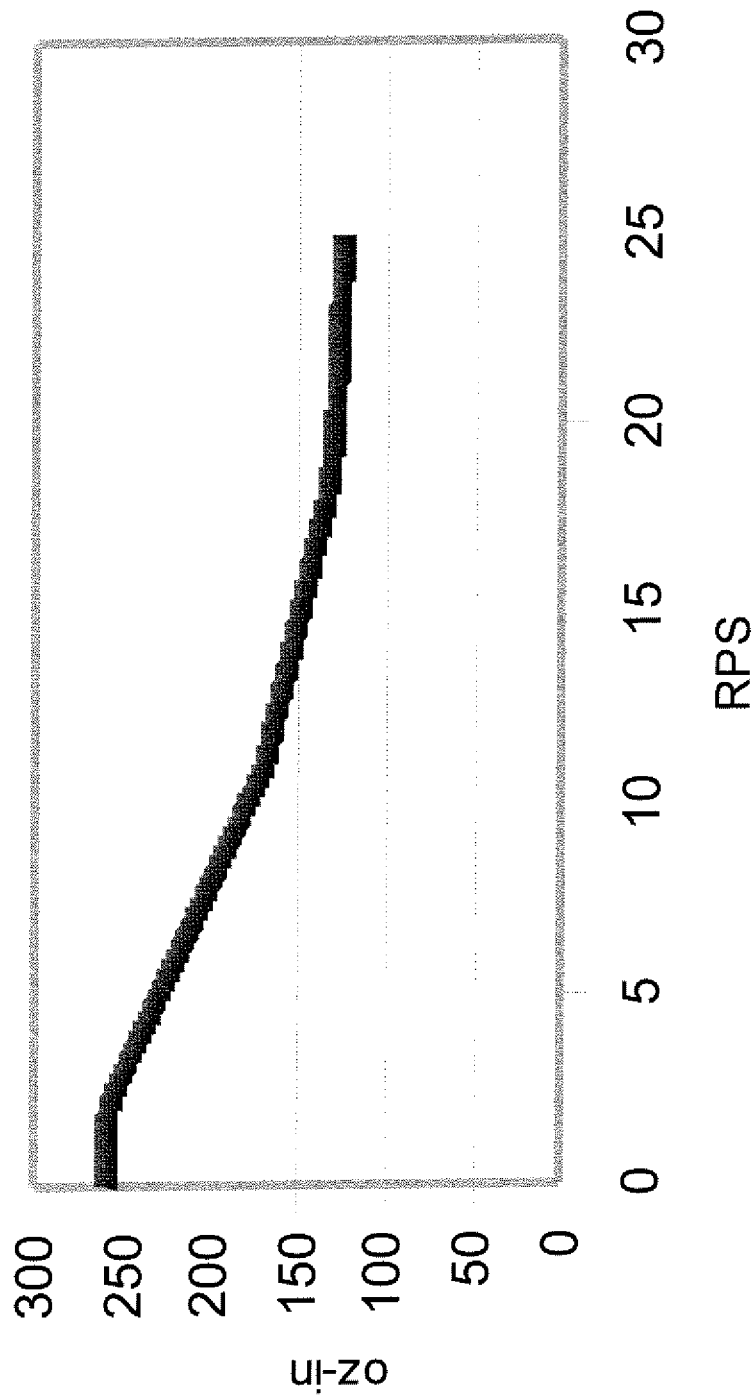
FIG. 5 is a graphical representation illustrating a torque frequency curve used for calculating the holding torque of the stepper motor according to the embodiments herein.

Due to the large angular inertia in the upper portion of the platform 101 the stepper motors 53a-53c comprise sufficient torque to prevent the stepper motors 53a-53c from skipping steps while undergoing high accelerations. The holding torque of the stepper motor 53c can be obtained from its torque frequency curve as shown in FIG. 5. The torque generated by the platform 101 (τ) is the product of the angular acceleration (α) and the inertial tensor (I) given by Equation (1):

$$\tau = I\alpha \quad (1)$$

The inertial tensor is a function of the mass (m) and radius (r) and can be approximated using Equation (2):

$$I = mr^2 \quad (2)$$

As an example, the upper portion of the platform 101 may comprise a 4 kg mass and a 0.18 meter radius. Accordingly, a gearbox 84 may be used overcome the inertial load. Therefore, the planetary gearbox 84 with a gear ratio of 10:1 may be used to scale the torque of the stepper motors 53a-53c an order of magnitude higher, thereby eliminating all skipping.

Each axis (pitch, roll, and yaw) on the platform 101 uses a dedicated stepper motor driver 55a-55c, respectively. For the pitch and roll axes, where two stepper motors 53a-53b are used, the wirings of each motor 53a-53b are mirrored. This prevents these motors 53a-53b from opposing each other in rotation. The inputs to each motor driver 55a-55c comprises of a direction, step signal, and 30V source. A current limiting resistor (not shown) may be used to protect the motor drivers 55a-55c from over-current. For the motors 53a-53c to make a micro-step, the motor drivers 55a-55c expect a transistor-transistor logic (TTL) signal's falling edge on the step signal input and a level on the direction input. Both direction and step signals can be driven by a 32-bit microcontroller 43 with four pulse width modulation (PWM) hardware generators (not shown).

The optical shaft encoders 51a-51c have a resolution of 2,000 steps per revolution and are affixed to the stepper motors 53a-53c, respectively, to measure angular position of the autopilot 103; one for pitch, roll, and yaw, respectively. The optical shaft encoders 51a-51c interface to a quadrature encoder to serial encoder interface (SET) adapter 41. The encoder/adapter 41 interfaces with the microcontroller 43, which reads the three encoder values using an RS-232 interface at 115,200 baud.

The stepper motors 53a-53c are used to control the platform 101. The motors 53a-53c are powered by the motor drivers 55a-55c that support micro-stepping to increase overall angular accuracy through the fractional energizing of adjacent coils. These drivers 55a-55c, which can deliver up to 7 amps, have high input impedance allowing TTL level signals to control the motors 53a-53c.

The microcontroller 43 is used to control the motors 53a-53c, process angular data from the encoders 51a-51c, and receive angular update commands from the computer 44. The stepper motors 53a-53c may be updated at 20 Hz. A computer-readable software module may be used to interface 48 the simulator 45 to the microcontroller 43. During each update, the microcontroller 43 receives a sequence of bytes from the simulator 45 containing three angles for pitch, roll, and yaw, respectively. The microcontroller 43 then polls each of the three encoders 51a-51c for their angular values. Based upon the current and desired position of the stepper motors 53a-53c, a PWM frequency is calculated and set for each stepper motor 53a-53c. This instructs the stepper motors 53a-53c to rotate the platform 101 to the desired attitude.

Should the stepper motors 53a-53c happen to slip due to an unexpected mechanical or software error, the use of optical shaft encoders 51a-51c ensure that motor slippage will not affect the resulting attitude. The optical shaft encoders 51a-51c with a resolution of 2,000 steps per revolution may be chosen to match the 2,000 steps per revolution of the stepper motors 53a-53c under the influence of micro-stepping. However, in the case of the yaw stepper motor 53c there are 20,000 steps per revolution due to the planetary gearbox 84 having a gear ratio of 10:1. Therefore, the optical encoders 51a-51c are capable of detecting a single micro-step from the stepper motors 53a-53c. For the pitch and roll axes this equates to 0.18 degrees per step and for the yaw axis the resolution is 0.018 degrees.

The platform 101 is configured to operate in two different modes. The first mode is open loop and the second mode is closed loop. These modes provide a means of testing the performance of the autopilot 103 under different conditions in a controlled environment. This type of testing allows for fine tuning of the control algorithm on the autopilot 103 as well as the reduction of IMU errors. Once testing is complete the autopilot 103 is mission ready once it leaves the controlled environment. Such a methodology provides for minimal risk testing and calibration of autopilots 103 and control algorithms.

Figure 6:
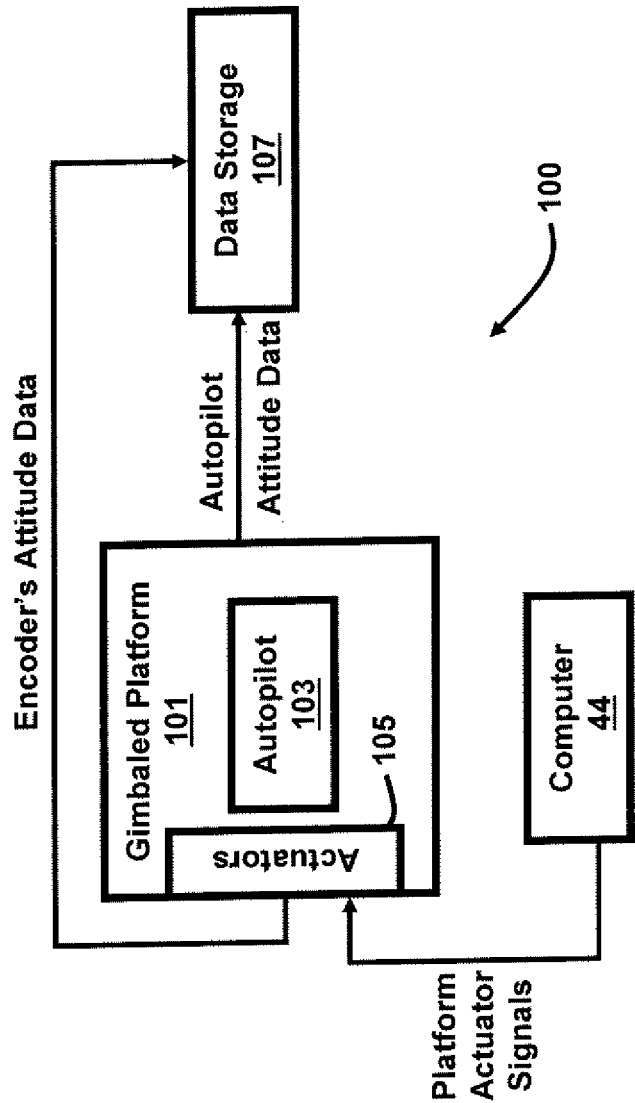
FIG. 6 illustrates a block diagram of an open-loop system according to the embodiments herein.

When configured as an open loop system 100 as shown in FIG. 6, the autopilot 103 is placed on the gimbaled platform 101 and the computer 44 is programmed to actuate 105 the platform 101 such that it subjects the autopilot 103 to designated attitudes. The autopilot sensors 60 report these attitudes to a data storage computer 107 and the shaft encoders 51a-51c provide a precise measure of the exact attitude. This setting allows for the calibration of the IMU 47 of the autopilot 103 using the difference between the reported and actual attitudes.

This setting can also be used to correct errors in the IMU attitude algorithms. By compiling data from the IMU 47 together with the corresponding data from the shaft encoders 51a-51c, filtering techniques such as neural networks or Kalman filters can be employed to minimize errors in the IMU's algorithms.

In addition to calibrating IMU hardware 47, the platform 101 could be used as a synchronization apparatus. An example of a system that can greatly benefit from such an apparatus is the target geolocation acquisition (TGA) system. A TGA setup comprises of a camera 77, GPS 62, and IMU 47. Sensor fusion would then occur between the camera frame, IMU attitude, and GPS position to determine an approximate ground position based on a designated pixel in the camera frame. Synchronization of data from the camera 77, GPS 62, and IMU 47 has a direct impact on the geolocation accuracy.

Figure 7:
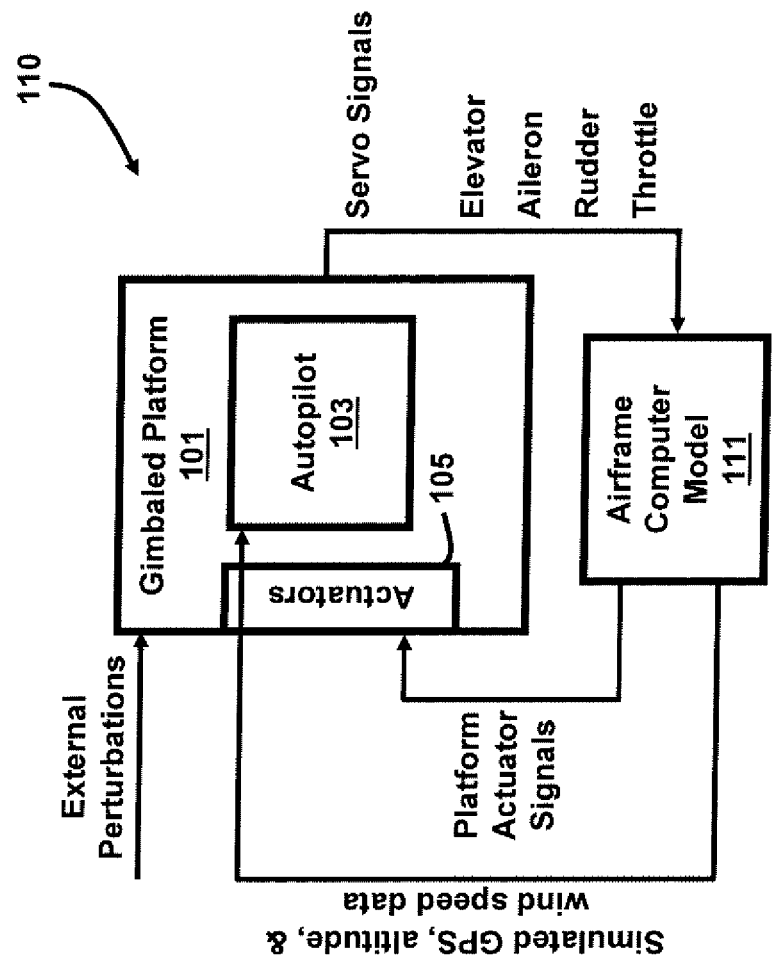
FIG. 7 illustrates a block diagram of a closed-loop system according to the embodiments herein.

In the closed loop configuration 110 shown in FIG. 7, the autopilot 103 drives the simulator 45 as the simulator 45 drives the platform 101. Between each time step of the simulator 45, the autopilot 103 reads its IMU 47 to obtain new attitude data. This attitude is then processed by a control algorithm 111 on-board the autopilot 103; e.g., embodied as a proportional integral derivative (PID) controller, or a model predictive controller, etc. This control algorithm 111 determines the adjustments necessary to the control surfaces of the vehicle 75 to meet the desired attitude. These control surface adjustments, such as throttle, elevator, rudder, and aileron, are then transmitted to the simulator 45.

Once the simulator 45 receives these updates its internal flight dynamics engine (not shown) calculates a new attitude based on the user-selected airframe. These new Euler angles are transmitted to the microcontroller 43, which instructs the stepper motors 53a-53c to match the new attitude. Once the new attitude is reached the feedback loop is closed and the process repeats.

This feedback loop typically runs at a frequency of 20 Hz, but is capable of running at higher or lower frequencies as well. The frequency is a function of the aircraft's stability and speed profile. As a general rule of thumb the smaller or faster the aircraft, the higher this frequency should be.

Communications with simulator 45 can occur through an interface module 48, which behaves as a stand-alone computer-readable program, and which may execute an internal control algorithm on the simulator data or propagate the data to the autopilot 103. Before any control algorithm processes the data from the simulator 45, the attitude data is converted and sent to the microcontroller 43. The microcontroller 43 then performs one of two different actions. Either the simulator data can be propagated to the autopilot 103 or it can be passed to a local control algorithm 111. If the data is propagated to the autopilot 103, it may use its IMU data in lieu of the simulator attitude data. However, passing the data does not prohibit the autopilot 103 from using all of the simulator data as a type of virtual IMU. In either situation the module 45 waits for the autopilot 103 to return new control surface data. When the data is passed to the local control algorithm 111 the calculation of new control surface data is performed with minimum latency.

The microcontroller 43 is used to process data from the encoders 51a-51c, receive data from the computer 44, and drive the stepper motors 53a-53c to a specific position. Virtually any microcontroller 43 with two or more RS-232 ports and three or more PWM generators can be used. An RS-232 interface (not shown) at 115,200 baud is connected to the quadrature encoder 41 and another RS-232 interface (not shown) at 115,200 baud is connected to the computer 44. Three PWM outputs (not shown) are connected to the motor drivers 55a-55c to control the pitch, roll, and yaw stepper motors 53a-53c, respectively. Three general purpose input/output (I/O) lines (not shown), which control motor direction, may be connected to the motor drivers 55a-55c as well.

The frequency of the master clock (not shown) of the microcontroller 43 and PWM generators (not shown) determine the frequency range of the stepper motors 53a-53c as well as the resolution of stepper motor control as further indicated in Equation (3). The microcontroller 43 is configured to operate at 48,054,857 Hz. This is a function of the 18.432 MHz crystal oscillator and the phase locked loop (PLL) multiplier and divider hardware (not shown) within the microcontroller 43. The divider register (not shown) may be set to 14 and the multiplier (not shown) may be set to 73. Finally, a post scale division of 2 may be applied.

$$MClk_{Freq} = \frac{Freq_{osc} \times PLL}{Postscale \times \text{Divider}} \quad (3)$$

The master clock frequency of the microcontroller 43 dictates the range of frequencies that can be chosen for PWM generators (not shown). Each PWM generator has separate registers for the 16-bit period and duty values. Furthermore, there exists a register (not shown) to divide the master clock for the PWM generators frequency. The master clock may be divided by a value of 256, slowing the PWM frequency by that factor. The period register (not shown) is set to a value of 0xFFFF, which results in a period of 349.13 ms. Hence, the PWM outputs can generate a square signal between 2.86 Hz and 93.86 KHz. Since a full revolution of the pitch and roll stepper motors 53a-53b require 2,000 steps, while the yaw stepper motor 53c requires 20,000 steps, this equates to rotational rates spanning from $8.58 \times 10^{-2}$ to $2.82 \times 10^3$ RPM. This is clearly an acceptable range for providing slow to fast control over the stepper motors 53a-53c given that most stepper motors do not function beyond 3 KHz.

Figure 8:
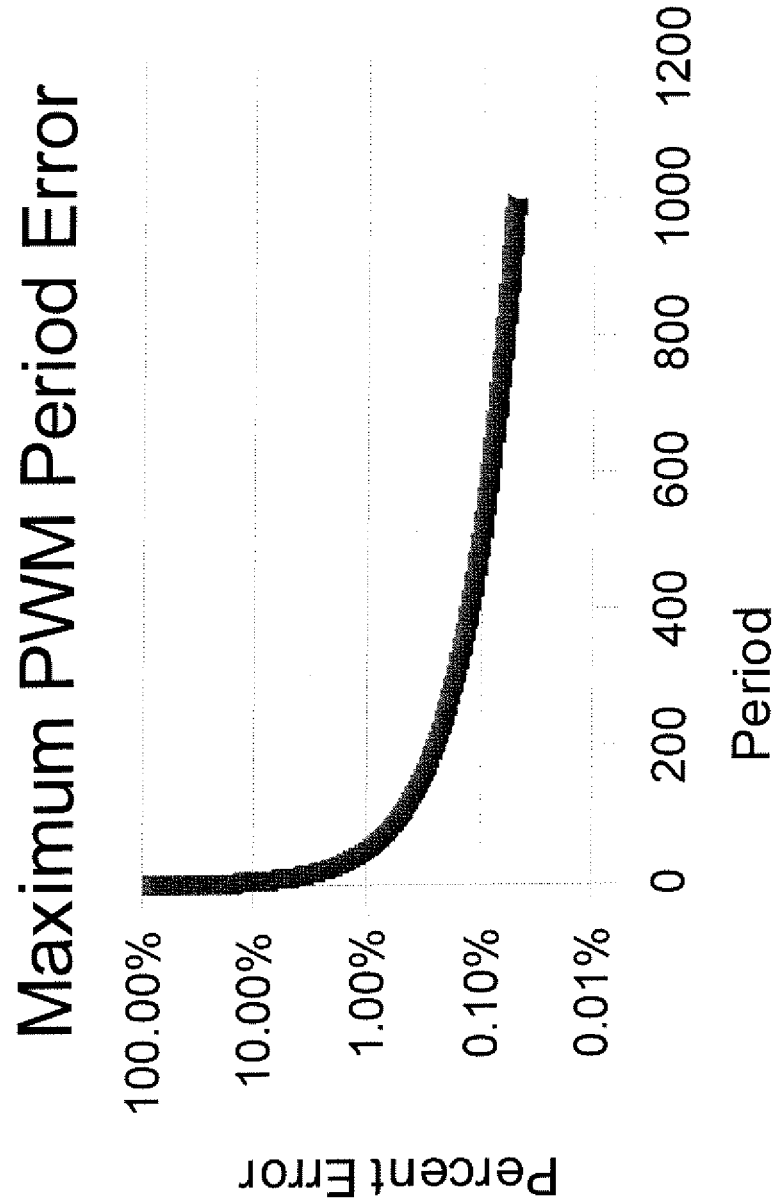
FIG. 8 is a graphical representation illustration the maximum PWM period error according to the embodiments herein.

Additionally, as the PWM period decreases the frequency error increases. This error is the result of having fewer bits available to represent smaller values. For example, if the desired period is 1,000.25 the closest integer value the hardware can represent is 1,000 resulting in an error of 0.025%. If the desired period is 1.25 the closest integer value the hardware can represent is 1 resulting in an error of 20%. A graph of the maximum error curve is shown in FIG. 8.

Once powered up, the microcontroller 43 sends several initialization commands to the quadrature encoder 41. The first of these commands is a baud rate change. For example, the encoder 41 communications rate is 9,600 baud. To keep latency at a minimum the microcontroller 43 instructs the encoder 41 to change its communication rate to 115,200 baud. The second set of commands instructs the encoder 41 to reset the internal counter for each encoder 51a-51c to zero. Therefore, the current position of the platform 101 is set as zero for each axis. The last initialization command is a poll on all three encoder channels to ensure that communications are working.

Once the initialization sequence on the microcontroller 43 is completed, it functions as an event driven process. The simulator 45 is set to output data at 20 Hz. The data sent to the microcontroller 43 comprises of three signed 16-bit values for pitch, roll, and yaw, respectively. The sign of the value denotes the direction in which the motors 53a-53c will spin. Therefore, the values for each axis can range from −32,768 to 32,767. These values signify the position that each motor 53a-53c will now assume. For pitch, which has a range of [−90, 90] degrees, the range of values are [−500, 500]. For roll, which has a range of [−180, 180] degrees, the range of values are [−1000, 1000]. For yaw, which has a range of [0, 360] degrees, the range of values are [0, 20000]. Each time the simulator 45 sends data to the microcontroller 43 it has to convert the pitch, roll, and yaw angles from the simulator 45 to the 16-bit values mentioned above. Once the microcontroller 43 receives the data, it polls the encoders 51a-51c for their current positions. For each axis a difference between current and new positions are calculated. The product of this equation is a PWM period, as indicated in Equations (4-6). The PWM period, in turn, defines the PWM frequency that corresponds to the angular velocity necessary to rotate each stepper motor 53a-53c from its current position to its new position. If the simulator 45 is configured to update at 20 Hz then the period between updates is 50 ms. The PWM duty is always half the PWM period. This can be accomplished by shifting the PWM period value to the right by one bit and storing that value in the PWM duty.

Certain calculated values may produce singularities that prevent the hardware from functioning properly. If σ in Equations (4-6) is zero then its best to turn the PWM generator (not shown) off or set it to its lowest frequency. If the PWM period is too low then the stepper motors 53a-53c may be driven at a frequency higher than they are capable of $$\sigma = \left[\frac{Position_{new} - Position_{cur}}{Period}\right] \quad (4)$$

$$\tau = \frac{MClk_{Freq}}{256} \quad (5)$$

$$PWM_{period} = \frac{\tau}{\sigma} \quad (6)$$

The embodiments herein may comprise hardware and software embodiments. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 9:
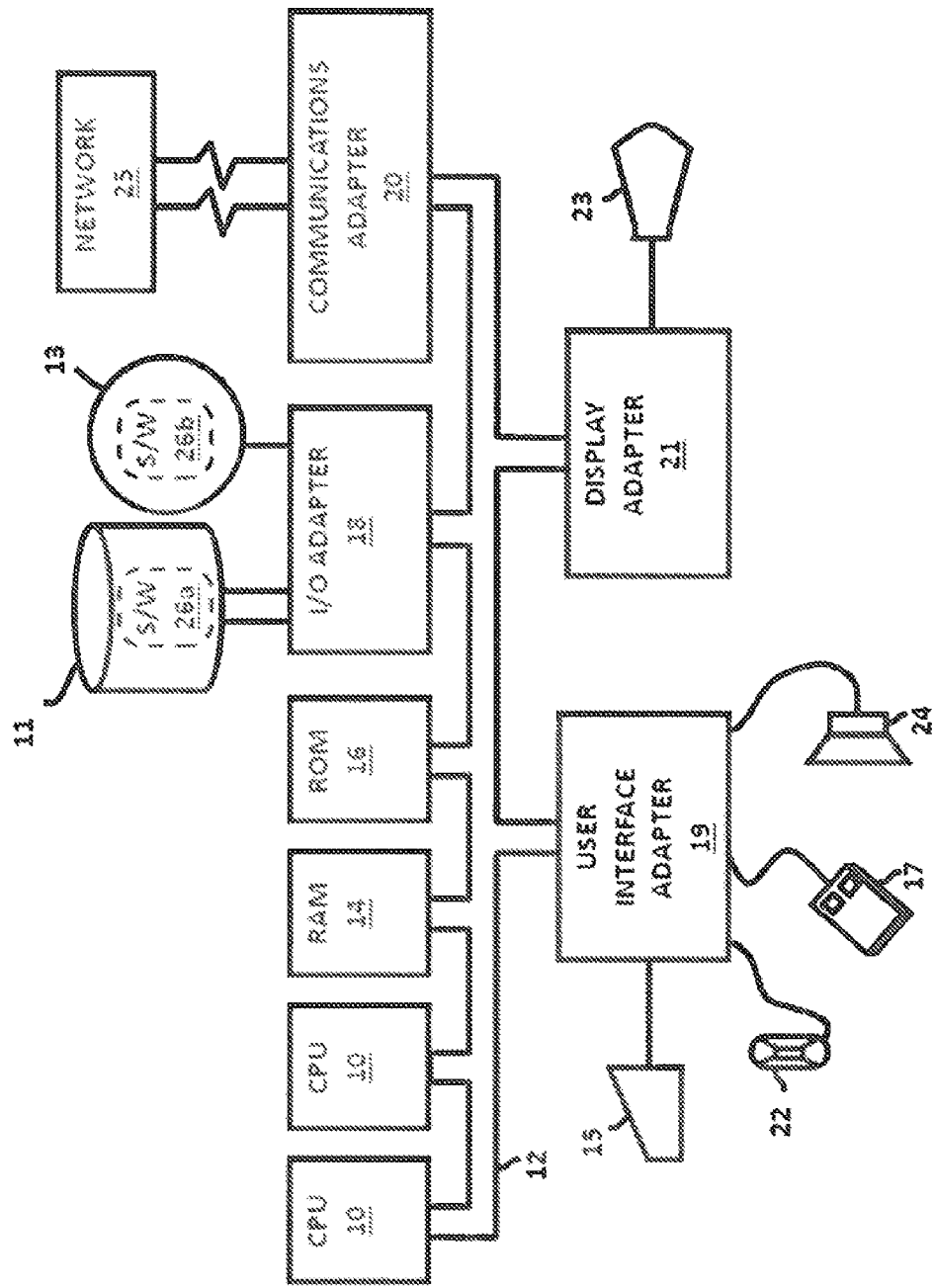
FIG. 9 illustrates a block diagram of a computer system used in accordance with the embodiments herein.

A representative hardware environment for practicing the embodiments herein is depicted in FIG. 9. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an I/O adapter 18. The I/O adapter 18 can connect to peripheral devices, such as disk units 11 and tape drives 13, or other program storage devices that are readable by the system. The system can read the inventive instructions, e.g., software (S/W) 26a or 26b, on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Figure 10:
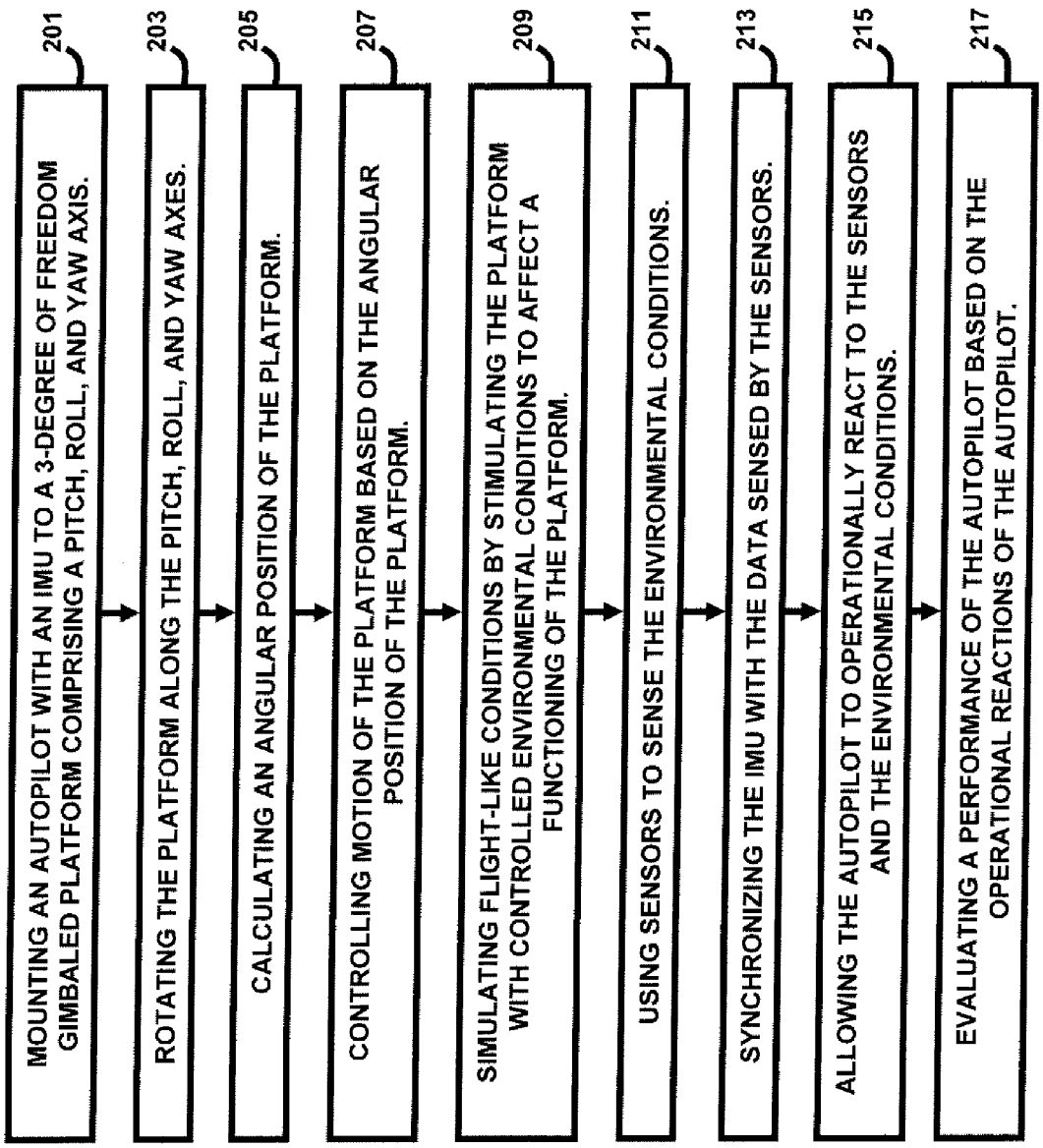
FIG. 10 is a flow diagram illustrating a method according to the embodiments herein.

FIG. 10, with reference to FIGS. 1A through 9, is a flow diagram illustrating a electro-mechanical method of training a micro air vehicle autopilot 103 to fly a simulated aeronautical vehicle 75 in a controlled experimental environment, wherein the method comprises mounting (201) the micro air vehicle autopilot 103 comprising an inertial measurement unit 47 to a three-degree of freedom gimbaled platform 101 comprising a pitch axis, a roll axis, and a yaw axis; rotating (203) the platform 101 along the pitch, roll, and yaw axes; calculating (205) an angular position of the platform 101; controlling (207) motion of the platform 101 based on the angular position of the platform 101; simulating (209) flight-like conditions by stimulating the platform 101 with controlled environmental conditions to affect a functioning of the platform 101; using (211) sensors 60 to sense the environmental conditions; synchronizing (213) the inertial measurement unit 47 of the micro air vehicle autopilot 103 with the data sensed by the sensors 60; allowing (215) the micro air vehicle autopilot 103 to operationally react to the sensors 60 and the environmental conditions; and evaluating (217) a performance of the micro air vehicle autopilot 103 based on the operational reactions of the micro air vehicle autopilot 103. The environmental conditions may comprise global positioning system bearings, wind speed, barometric pressure, temperature, humidity, and electromagnetically generated headings. The method may further comprise calibrating the micro air vehicle autopilot 103 using the operational reactions of the micro air vehicle autopilot 103 as a feedback control mechanism of the simulated flight-like conditions.

The embodiments herein provide a hardware in the loop simulator (HILS) system 2 that can be used as a universal development and evaluation system for miniature autopilots 103. The embodiments herein allow an autopilot 103 to fly a simulated airframe 75 while being stimulated with artificial GPS signals, wind speeds, barometric pressures, various temperatures, and electromagnetically generated headings, which reduces the autopilot's development time and cost. The HILS system 2 also allows for the enhancement of IMU performance, and the synchronization of various small unmanned aerial vehicle (UAV) components. Moreover, the embodiments herein have a direct impact on the performance of existing MAV systems by allowing for rapid evaluation of new MAV systems.

The embodiments herein provide a three-degree of freedom gimbaled platform 101 used for the development and evaluation of MAV autopilots 103. An autopilot 103 is mounted to the gimbaled platform 101. The computer 44 is then configured to run both a flight simulator 45 and an interface module 48 to permit communications between the flight simulator 45, gimbaled platform system 101, and the autopilot 103. The autopilot 103 is configured to transmit sensory data to the interface module 48. The data transmitted by the autopilot 103 contains flight surface control values which, after received by the interface module 48, are propagated to the flight simulator 45. The flight simulator 45 then applies the new control surface values, updates a dynamics model of a preselected aircraft 75, and sends updated command signals to the gimbaled platform system 101. The new stimuli produced by the gimbaled platform system 101 are received by the autopilot 103 and thus a feedback loop between the autopilot 103, flight simulator 45, and gimbaled platform 101 is created.

The embodiments herein may be used in several environments, including, but not limited to, autopilot sensor calibration (i.e., IMU, barometric, pitot, GPS, temperature, etc.); time synchronization between sensors and external systems (i.e., latency between IMU and video); tuning of control algorithms (i.e., model predictive or PID); evaluation of control algorithms; and comparing the quality of one autopilot to another in a systematic approach.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. An apparatus for training an autopilot to fly a simulated aeronautical vehicle, said apparatus comprising:
    a three-degree of freedom gimbaled platform comprising a pitch axis, a roll axis, and a yaw axis;
    an autopilot component operatively connected to said platform, wherein said autopilot component comprises an inertial measurement unit;
    a plurality of motors that rotate said platform along the pitch, roll, and yaw axes;
    a plurality of shaft encoders operatively connected to said plurality of motors, wherein said plurality of shaft encoders calculate an angular position of said platform;
    a plurality of motor drivers operatively connected to said plurality of motors, wherein said plurality of motor drivers power said plurality of motors;
    a microcontroller operatively connected to said plurality of motor drivers;
    a quadrature encoder operatively connected to said plurality of shaft encoders and said microcontroller;
    a plurality of sensors that generate and sense environmental conditions affecting said platform and said autopilot;
    a flight simulator module operatively connected to said microcontroller; and
    a computer that executes said flight simulator module, wherein execution of said flight simulator module causes actuation of said platform, causes said plurality of sensors to generate environmental conditions, and causes said autopilot component to react to said environmental conditions.

2. The apparatus of claim 1, wherein said plurality of motors comprises:
    a first pair of stepper motors that control movement of said platform along said pitch axis;
    a second pair of stepper motors that control movement of said platform along said roll axis; and
    a stepper motor that controls movement of said platform along said yaw axis.

3. The apparatus of claim 2, further comprising a planetary gearbox operatively connected to said motor that controls movement of said platform along said yaw axis.

4. The apparatus of claim 1, further comprising a temperature and pressure regulating enclosure that encases said platform.

5. The apparatus of claim 4, further comprising:
    means for forcing air into said enclosure; and
    means for drawing air out of said enclosure.

6. The apparatus of claim 1, wherein said microcontroller controls said plurality of motors, processes angular data from said plurality of shaft encoders, and receives angular update commands from said computer.

7. The apparatus of claim 6, wherein said microcontroller sends operational instructions to said quadrature encoder, and wherein said quadrature encoder sends said operational instructions to said plurality of shaft encoders.

8. The apparatus of claim 1, wherein said environmental conditions comprise global positioning system bearings, wind speed, barometric pressure, temperature, humidity, and electromagnetically generated headings.

9. The apparatus of claim 1, wherein said platform operates in an open loop mode such that said computer generates signals to actuate said platform to subject said autopilot component to designated attitudes.

10. The apparatus of claim 1, wherein said platform operates in a closed loop mode such that said autopilot component drives said flight simulator module as said flight simulator module drives said platform, and wherein between each time step of said flight simulator module, said autopilot component reads said inertial measurement unit to obtain updated attitude data.

11. A system for training an autopilot to fly a simulated aeronautical vehicle, said system comprising:
    a three-degree of freedom gimbaled platform comprising a pitch axis, a roll axis, and a yaw axis;
    a micro air vehicle autopilot operatively connected to said platform, wherein said micro air vehicle autopilot comprises an inertial measurement unit;
    a temperature and pressure regulating enclosure that encases said platform and said micro air vehicle autopilot;
    a first pair of motors that control movement of said platform along said pitch axis;
    a second pair of motors that control movement of said platform along said roll axis;
    a motor that controls movement of said platform along said yaw axis;
    a gearbox operatively connected to said motor that controls movement of said platform along said yaw axis;
    a plurality of shaft encoders operatively connected to the plurality of motors, wherein said plurality of shaft encoders calculate an angular position of said platform;
    a plurality of motor drivers operatively connected to said plurality of motors, wherein said plurality of motor drivers power said plurality of motors;
    a microcontroller operatively connected to said plurality of motor drivers;
    a quadrature encoder operatively connected to said plurality of shaft encoders and said microcontroller;
    a plurality of sensors that generate and sense environmental conditions affecting said platform and said micro air vehicle autopilot, wherein said environmental conditions comprise global positioning system bearings, wind speed, barometric pressure, temperature, humidity, and electromagnetically generated headings;
    a flight simulator operatively connected to said microcontroller; and
    a computer that executes said flight simulator, wherein execution of said flight simulator module causes actuation of said platform, causes said plurality of sensors to generate environmental conditions, and causes said micro air vehicle autopilot to react to said environmental conditions.

12. The system of claim 11, wherein said gearbox comprises a planetary gearbox comprising a gear ratio of 10:1.

13. The system of claim 11, further comprising:
    means for forcing air into said enclosure;
    means for drawing air out of said enclosure; and
    a video camera operatively connected to said platform.

14. The system of claim 11, wherein said microcontroller controls said first pair of motors, said second pair of motors, and said motor, processes angular data from said plurality of shaft encoders, and receives angular update commands from said computer.

15. The system of claim 14, wherein said microcontroller sends operational instructions to said quadrature encoder, and wherein said quadrature encoder sends said operational instructions to said plurality of shaft encoders.

16. The system of claim 11, wherein said platform operates in an open loop mode such that said computer generates signals to actuate said platform to subject said micro air vehicle autopilot to designated attitudes.

17. The system of claim 11, wherein said platform operates in a closed loop mode such that said micro air vehicle autopilot drives said flight simulator as said flight simulator drives said platform, and wherein between each time step of said flight simulator, said micro air vehicle autopilot reads said inertial measurement unit to obtain updated attitude data.

18. An electro-mechanical method of training a micro air vehicle autopilot to fly a simulated aeronautical vehicle in a controlled experimental environment, said method comprising:
mounting said micro air vehicle autopilot comprising an inertial measurement unit to a three-degree of freedom gimbaled platform comprising a pitch axis, a roll axis, and a yaw axis;
rotating said platform along the pitch, roll, and yaw axes;
calculating an angular position of said platform;
controlling motion of said platform based on said angular position of said platform;
simulating flight-like conditions by stimulating said platform with controlled environmental conditions to affect a functioning of said platform;
using sensors to sense said environmental conditions;
synchronizing said inertial measurement unit of said micro air vehicle autopilot with said data sensed by said sensors;
allowing said micro air vehicle autopilot to operationally react to said sensors and said environmental conditions; and
evaluating a performance of said micro air vehicle autopilot based on the operational reactions of said micro air vehicle autopilot.

19. The method of claim 18, wherein said environmental conditions comprise global positioning system bearings, wind speed, barometric pressure, temperature, humidity, and electromagnetically generated headings.

20. The method of claim 18, further comprising calibrating said micro air vehicle autopilot using said operational reactions of said micro air vehicle autopilot as a feedback control mechanism of the simulated flight-like conditions.

* * * * *